Feb. 23, 1932.  M. BERLIET  1,846,580
SPARE WHEEL FOR MOTOR VEHICLES
Filed Sept. 28, 1929   3 Sheets-Sheet 1
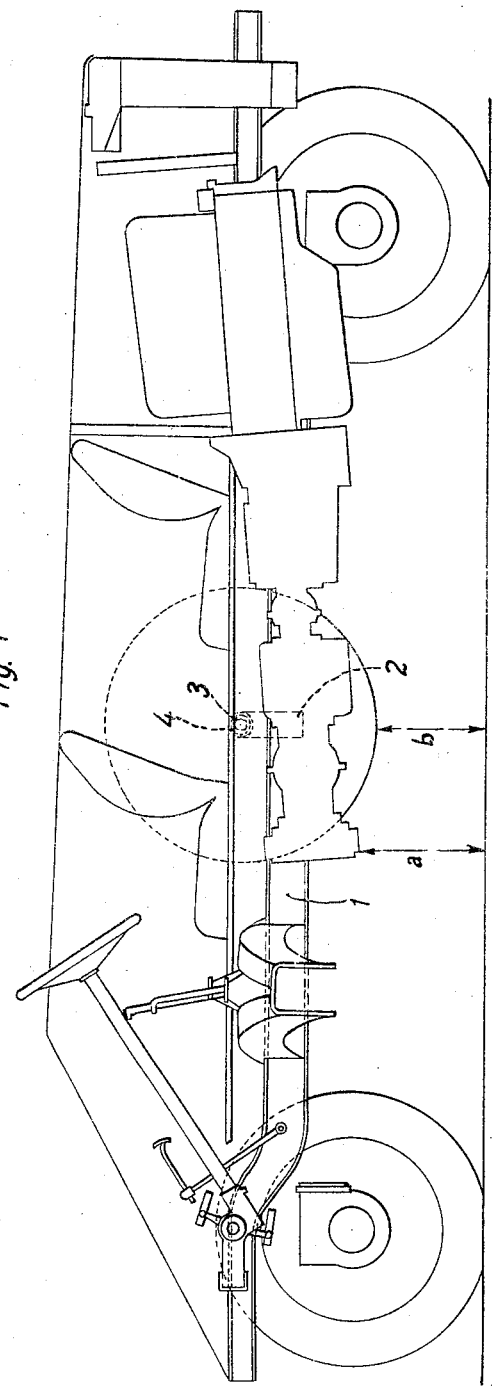

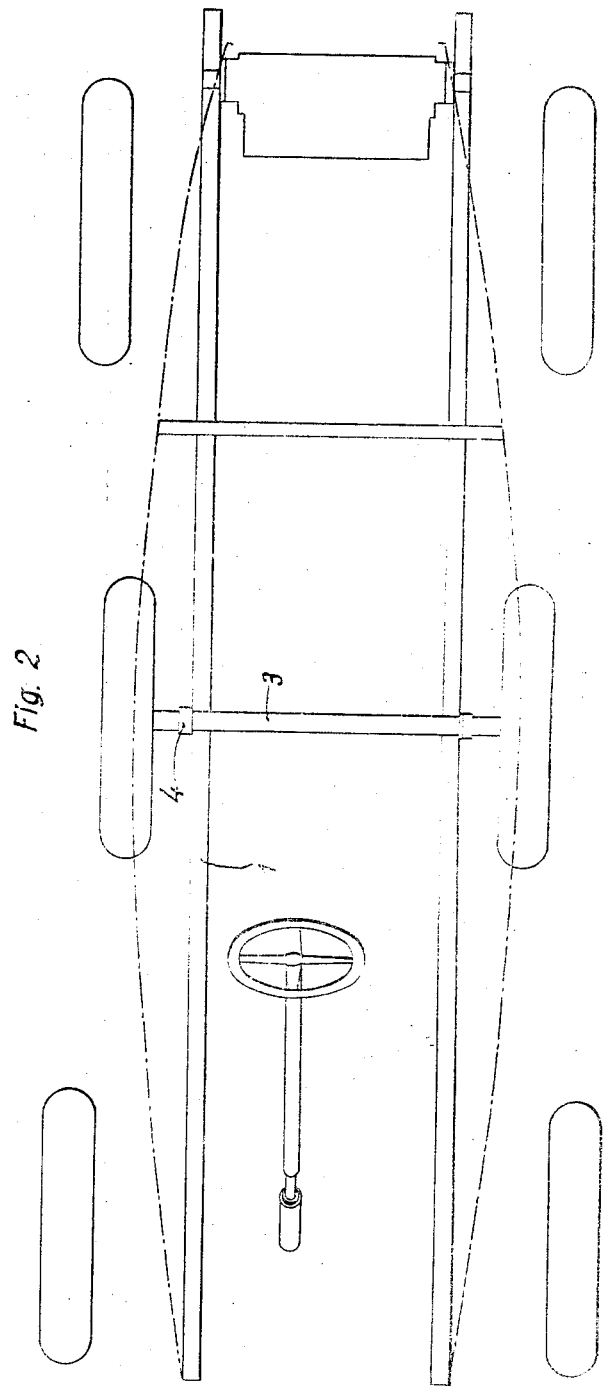

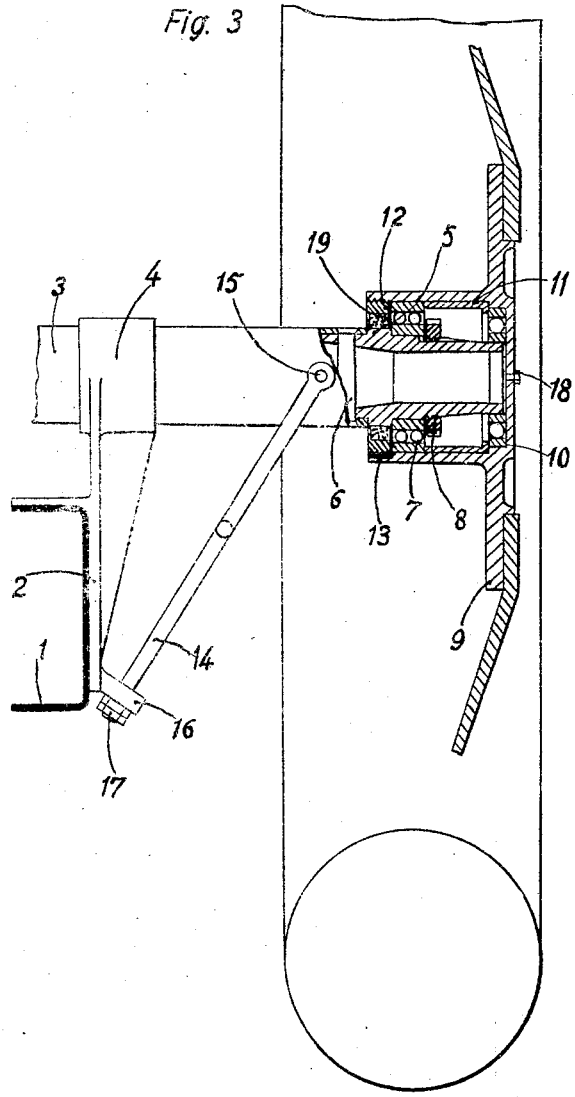

Patented Feb. 23, 1932

1,846,580

UNITED STATES PATENT OFFICE

MARIUS BERLIET, OF LYON, FRANCE, ASSIGNOR TO SOCIETE ANONYME DES AUTOMOBILES M. BERLIET, OF LYON, FRANCE

SPARE WHEEL FOR MOTOR VEHICLES

Application filed September 28, 1929, Serial No. 395,943, and in France October 2, 1928.

The present invention relates to motor vehicles provided with spare wheels disposed on each side of the vehicle frame, and wherein the spare wheels are mounted loose on axles secured to the said frame, and are situated at a predetermined height, in such manner that they may be used as middle supporting wheels for the vehicle when traveling upon broken ground, in order to pass over certain obstacles.

When motor vehicles are to travel upon all kinds of ground, such as fields, bad roads, or the like, it is advantageous to employ a pair of rollers or wheels so arranged that the lower of the said wheels is nearer to the ground (on flat land) by some 10 centimeters than the lowest part of the casings. In this manner, the vehicle, when passing over a slope, a tree trunk, a pile of stones, or like obstacles, will not rest upon such casings, as this would produce a friction acting greatly against the forward travel just at the most critical time when one of the two pairs of the vehicle wheels is above ground as in the case of four-wheeled vehicles.

The invention consists in the use, for this function of extra wheels, of the spare wheels themselves, which are mounted loose on axles secured to the vehicle frame at the proper places. When the vehicle clears the obstacle, the said wheels aid in the travel and the tilting of the vehicle. The said wheels may eventually be employed with adhesion chains.

In the accompanying drawings:

Figure 1 is a general diagrammatic view of a military estafette vehicle, by way of example.

Figure 2 is a corresponding plan view.

Figure 3 is a vertical section, by way of example, through the axle supporting a wheel.

Referring to the said drawings, its is observed that upon each side of the vehicle frame is secured upon the side beams 1, a bracket 2 adapted to hold by means of a collar 4 a supporting tube 3 disposed crosswise of the vehicle frame. On the respective ends of said tube are mounted an axle 5 which is fitted by hard friction, and is pinned at 6. Said axle 5 carries a ball bearing 7 held against a shoulder by a nut 8. The false hub of the wheel 9 carries a second ball bearing 10, which is held by a ring 11, and said hub fits upon the end of the shaft 5 and also upon the outer ring of the ball bearing 7. Said hub 9 is maintained in place by a notched nut 12 cooperating with a securing sheet metal member 13, whose projections are bent into the notches of said nut 12, whereby the said nut is held in place.

The device is made leakless as regards the lubrication, by the felt member 19. A forked strut 14 can be mounted on the tube by the axles 15 and by a lug 16 of the said bracket 2, by means of nuts and lock nuts 17, for the proper stiffness of the construction. When the spare wheel passes over a ridge, the said strut is subjected to traction as a draw-bar. The hub 9 is lubricated by an oiler 18.

Obviously, the said invention is exemplified by all other arrangements allowing the spare wheel to rotate freely, and providing a protection situated below the lowest point of the casings. It is simply necessary that, the distance between the ground and the lowest point of the casing being represented by $a$ and the distance between the ground and the lowest point of the safety wheel being represented by $b$, the quantity $a-b$ shall be about 3 to 6 inches.

Claim:

The combination with a motor driven vehicle and its side frames, of brackets fixed to the side frames at points between the front and rear wheels of the vehicle, said brackets having bearing collars upon their upper ends, lugs upon their lower ends, a tube extending transversely of the side frames and engaged in the bearing collars, axles fixed in the ends of the tube, wheels rotatable on the axles, struts connecting the lugs and the outer ends of the tubes, said wheels being of a diameter to prevent parts of the vehicle depending below the side frames from contacting with the ground, as and for the purpose set forth.

MARIUS BERLIET.